(12) United States Patent
Borowski

(10) Patent No.: US 8,788,639 B2
(45) Date of Patent: Jul. 22, 2014

(54) METHOD AND APPARATUS FOR CENTRALLY CONFIGURING NETWORK DEVICES

(75) Inventor: Olaf Borowski, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 965 days.

(21) Appl. No.: 11/129,550

(22) Filed: May 13, 2005

(65) Prior Publication Data

US 2006/0256735 A1 Nov. 16, 2006

(51) Int. Cl.
*G06F 15/173* (2006.01)

(52) U.S. Cl.
USPC ............ 709/223; 709/224; 370/351; 370/356

(58) Field of Classification Search
USPC .................................................. 709/223–224
See application file for complete search history.

(56) References Cited

U.S. PATENT DOCUMENTS

| 6,108,702 | A * | 8/2000 | Wood | 709/224 |
|---|---|---|---|---|
| 6,363,420 | B1 * | 3/2002 | Coward | 709/221 |
| 6,535,507 | B1 * | 3/2003 | Li et al. | 370/356 |
| 6,766,482 | B1 * | 7/2004 | Yip et al. | 714/717 |
| 7,054,932 | B2 * | 5/2006 | Herrmann et al. | 709/226 |
| 7,120,690 | B1 * | 10/2006 | Krishnan et al. | 709/225 |
| 7,269,648 | B1 * | 9/2007 | Krishnan et al. | 709/224 |
| 7,389,273 | B2 * | 6/2008 | Irwin et al. | 705/59 |
| 2002/0026506 | A1 * | 2/2002 | Herrmann et al. | 709/223 |
| 2003/0225859 | A1 * | 12/2003 | Radia et al. | 709/219 |
| 2004/0103312 | A1 * | 5/2004 | Messerges et al. | 713/201 |
| 2005/0086514 | A1 * | 4/2005 | Han et al. | 713/200 |
| 2005/0102513 | A1 * | 5/2005 | Alve | 713/168 |
| 2006/0007909 | A1 * | 1/2006 | Borowski | 370/351 |
| 2006/0080425 | A1 * | 4/2006 | Wood et al. | 709/223 |

* cited by examiner

*Primary Examiner* — Hua Fan

(57) ABSTRACT

A method for configuring network devices in a network includes creating a domain having a management device and a plurality of select network devices. A configuration command is issued from the management device to a central network device in the domain to configure at least one of the network devices in the domain identified by the management device. The central network device then issues a configuration command to each of the identified select network device.

11 Claims, 6 Drawing Sheets

METHOD AND APPARATUS FOR CENTRALLY CONFIGURING NETWORK DEVICES

FIELD OF INVENTION

The present invention relates to network device management, and in particular, to configuration of network devices from a central network device.

BACKGROUND OF THE INVENTION

A typical network environment includes a number of user devices such as computers, workstations, and servers, and network devices such as routers, hubs, switches, firewalls and load balancers. A local area network (LAN), a wide area network (WAN), and the Internet are examples of known computing or communication networks.

In a known network environment, a user or network administrator uses a computer, workstation or a server as a network management station to individually communicate with each of the network devices that requires configuration. An example of the manner in which network devices are configured according to a known method is shown in FIG. 6. Typically, a network administrator connects to the first (or next) device (block 50) and configures that device to the desired settings (block 52). This requires additional intermediate steps such as logging into the device, going into an enable mode and a configuration mode, creating the desired configuration, adding ports to the device and saving the new configuration. When this process has been completed, the network administrator exits from connected device (block 54). Then, if there are additional devices to be configured (block 56), the administrator then connects to the next device (block 50), configures that device (block 52) and exits from the device (block 54), performing all the intermediate steps described above. Subsequently, the administrator repeats these steps for any additional devices. Individually connecting, configuring and exiting every network device requiring configuration is time consuming, particularly in networks where there may be hundreds of network devices.

SUMMARY OF THE INVENTION

The present invention is directed to a method for configuring devices in a network. One embodiment of the invention includes creating a domain having a management device or administrator and a plurality of select network devices. A configuration command is issued from the management device to a central network device in the domain to configure at least one of the network devices in the domain identified by the management device. The central network device then issues a configuration command to each of the identified select network device.

DETAILED DESCRIPTION OF THE INVENTION

Broadly stated, the present invention is directed to apparatus and methods for centrally configuring multiple network devices in a network. In accordance with one embodiment of the present invention, a selected number of network devices are grouped into a common domain, i.e., connected into a logical grouping, so that they are in communication with each other. The definition of the domain and the addition of devices to the domain is also the basis for secure communication. Meaning, only members of this domain accept configuration requests and are able to issue configuration requests. To configure one or more of the network devices within the domain, a network administrator connects to any of the devices in the domain, which device then becomes a central network device during the process of configuration. From the central device, commands from the network administrator may be sent to any of the network devices, some group of devices or all devices in the domain. In this manner, the network administrator needs to only connect to one network device, rather than to each network device individually, thereby freeing the network administrator for other tasks.

Figure 1:
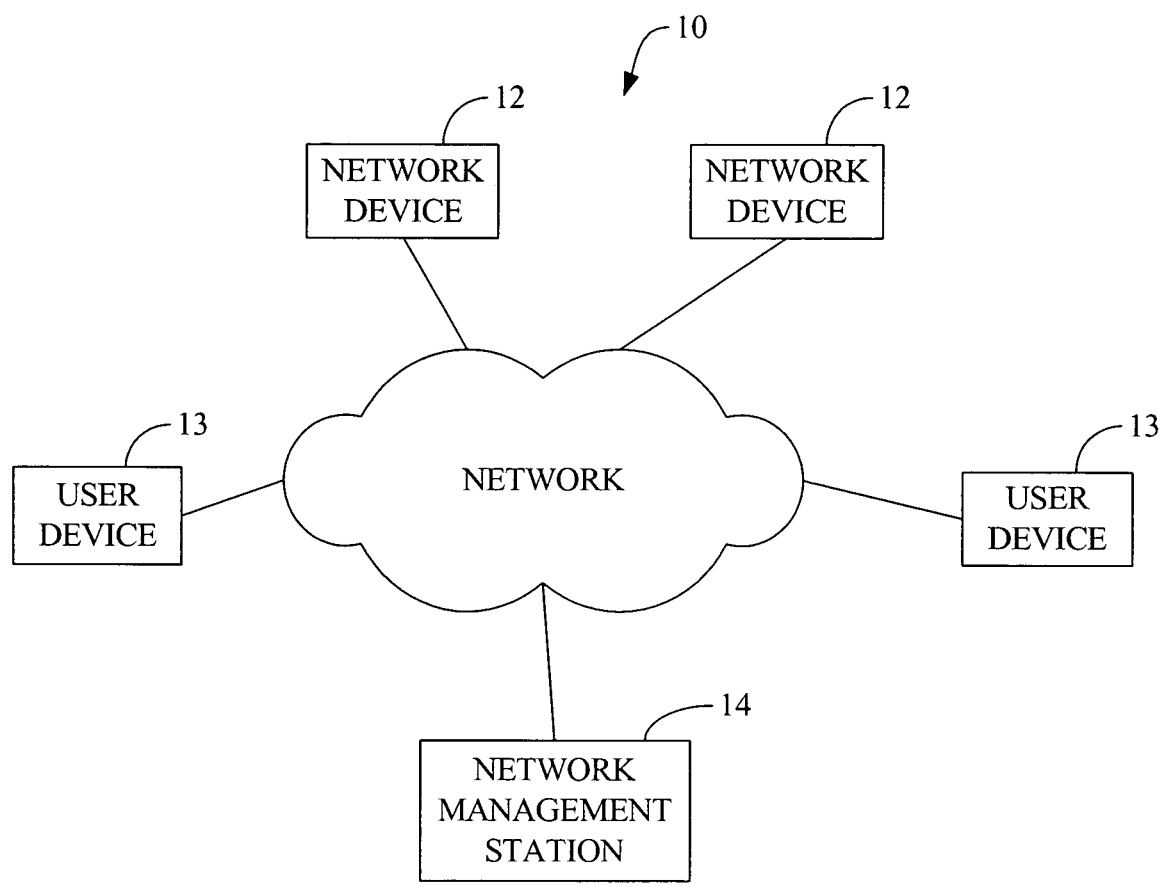
FIG. 1 is a diagram of a network environment in which the present invention is adapted to be implemented.

Turning now to FIG. 1, the present invention is adapted to be implemented in a communication network 10 which may be a LAN, a WAN or the Internet, for example. The network 10 includes a plurality of network devices 12 (two individually shown), which may be switches, routers, hubs, firewalls and load balancers, for example. A plurality of user devices 13 and a network management station 14 in the form of a computer, workstation, or a server are in communication with the network 10. The network management station 14 enables a user or network administrator to access and configure network devices 12 in the network 10.

Figure 2:
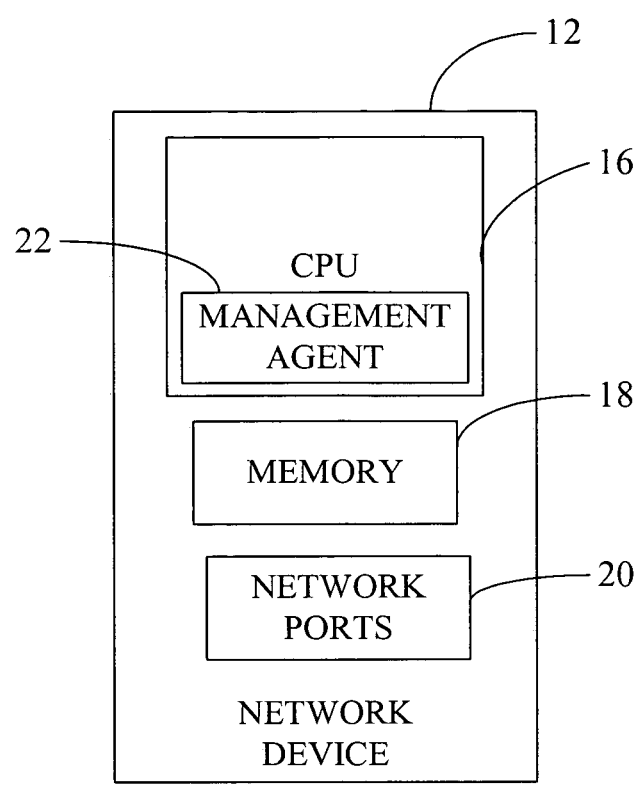
FIG. 2 is a block diagram of network devices used in implement of the present invention.

As shown in FIG. 2, the network devices 12 each includes a central processing unit (CPU) 16 for operating and managing various functions of the network device, a memory 18 for storing data used by the CPU and data that are received from and sent to the network 10, and network ports 20 which connect the network device to the network for sending and receiving data to and from the network. The CPU 16 also includes a management agent 22, which is responsible for handling communication between the local network device 12 and the other devices in the network and the network management station 14. Communication between the network management station 14 and the management agent 22 in the network devices 12, and between the management agents in different network devices 12 may be conducted through any known network protocol such as SNMP, SSH, XML or Telnet (CLI), for example.

Figure 3:
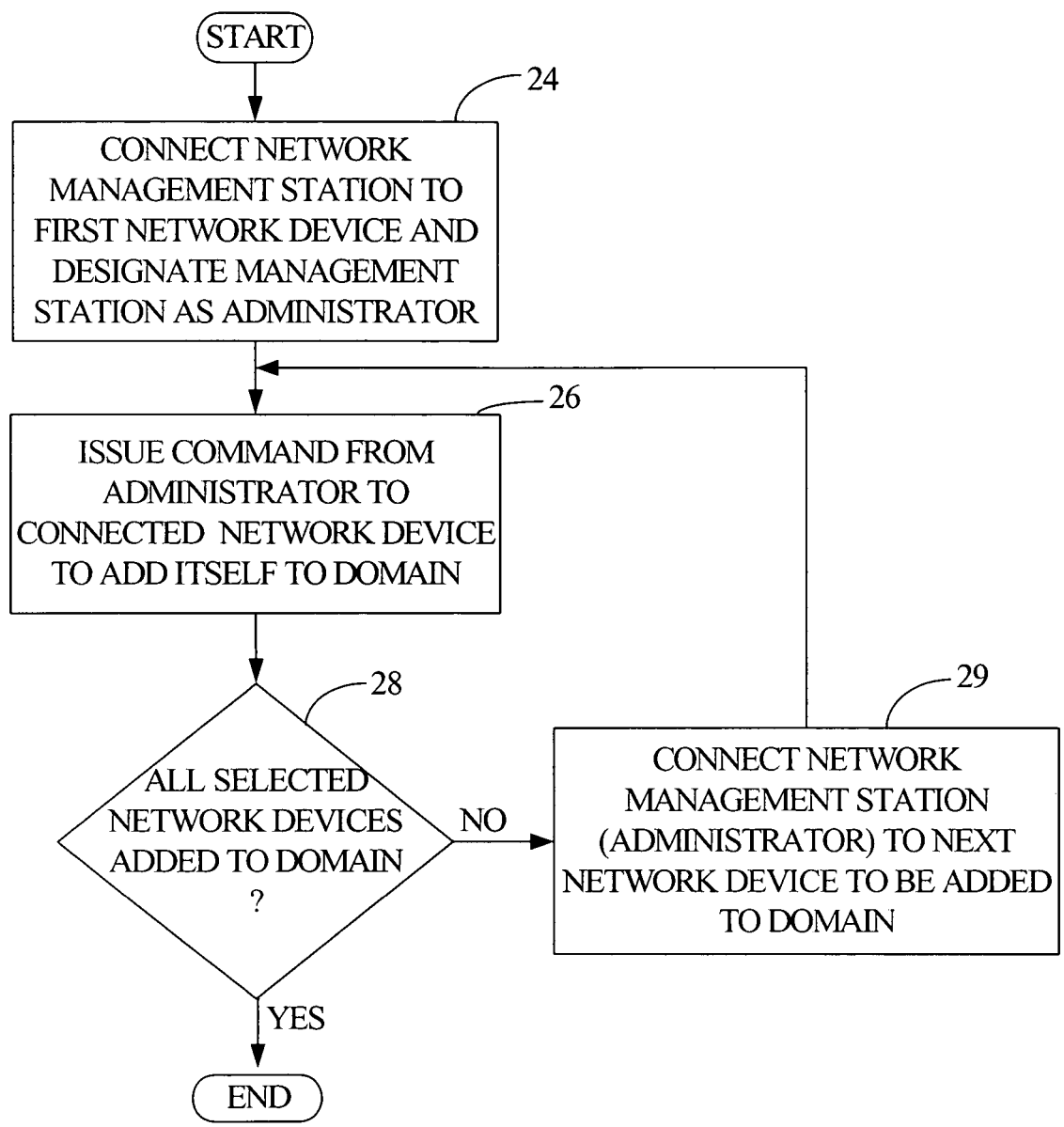
FIG. 3 is a flowchart for describing the manner in which a domain is created in accordance with one embodiment of the present invention.
Figure 4:
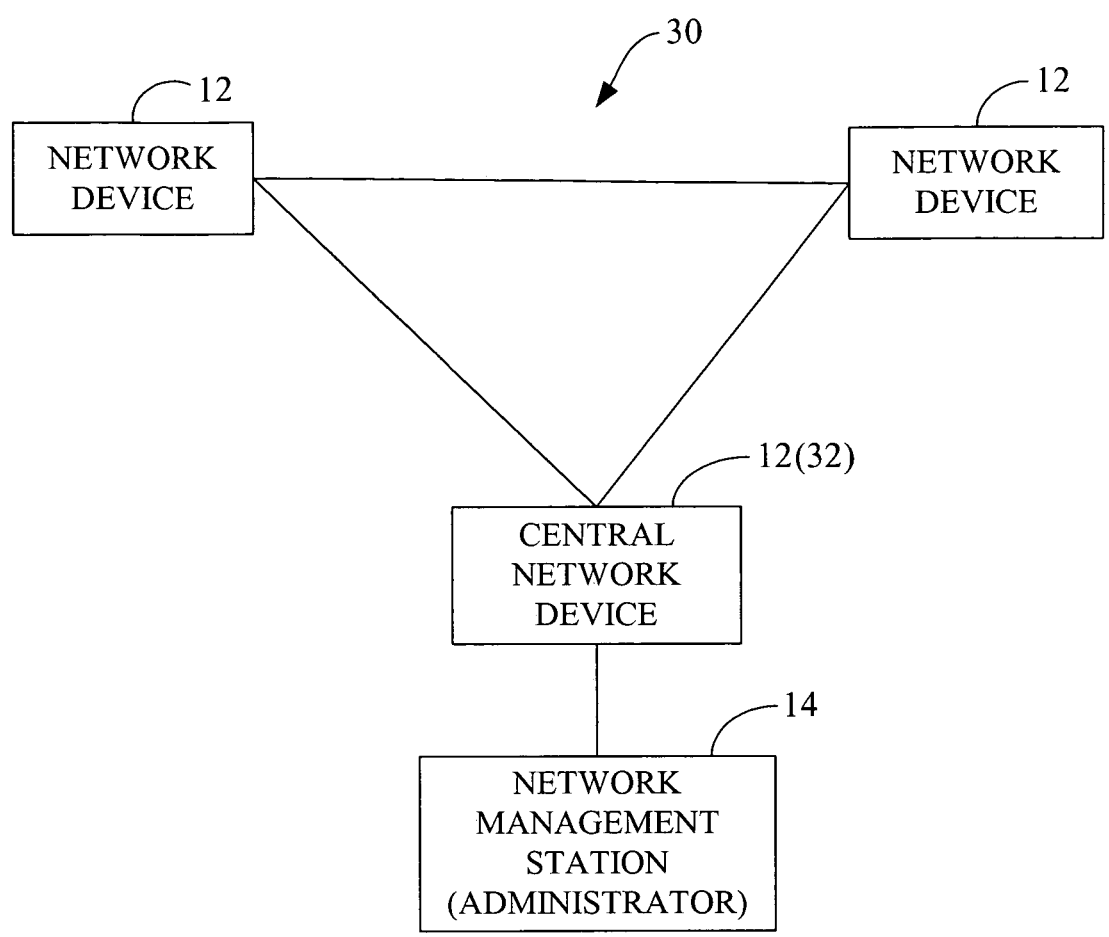
FIG. 4 is an illustration of the domain described in FIG. 3.

Referring to FIGS. 3 and 4, one embodiment of the present invention for configuring network devices includes creating a domain 30 which connects a selected number of network devices 12 in the network 10 into a logic group. To create the domain 30, the network management station 14 initially connects to any one of the selected network devices 12 (block 24). Upon connection to the first network device 12, the network management station 14 designates itself as the administrator of the domain 30. More specifically, the network management station 14 sends a command to the management agent 22 residing in the CPU 16 of the connected network device 12 instructing that network device to logically create domain 30 and add itself to the domain (block 26). The CPU 16 processes this request and stores it in the memory 18. This initial configuration task is performed to add each of the selected network devices 12 that need to be managed within the domain 30 (blocks 28, 29).

Once all selected network devices 12 have been added to the domain 30, the network management station or administrator 14 can connect to any network devices in the domain 30 to perform configuration tasks. For any particular session, the network device 12 that the network administrator 14 logs into at the start becomes the central network device 32 (best shown in FIG. 4). Since all domain members are now aware of each other, each network devices 12 in the domain 30 keeps a table of its members in the memory 18. On any device 12, the administrator 14 can list domain members, add or delete domain members or perform configuration requests. When performing configuration requests (after the initial configuration to create the domain 30), the administrator 14 can configure one particular device, a group of devices or all devices within the domain 30 with a single configuration command. In one embodiment of the present invention, the network devices 12 and the administrator 14 are in a "trusted," or secure, relationship, so that any configuration requests are accepted only from other domain members. As described below, any member of the domain 30 may send a configuration request. A trusted relationship may be established through an encrypted path between the domain members, for example.

In another embodiment of the present invention, the network management 14 may create multiple domains 30 in the network 10. Each domain 30 is created as described above and any network devices 12 may also be in one or more domains 30 as instructed by the network management station 14.

Figure 5:
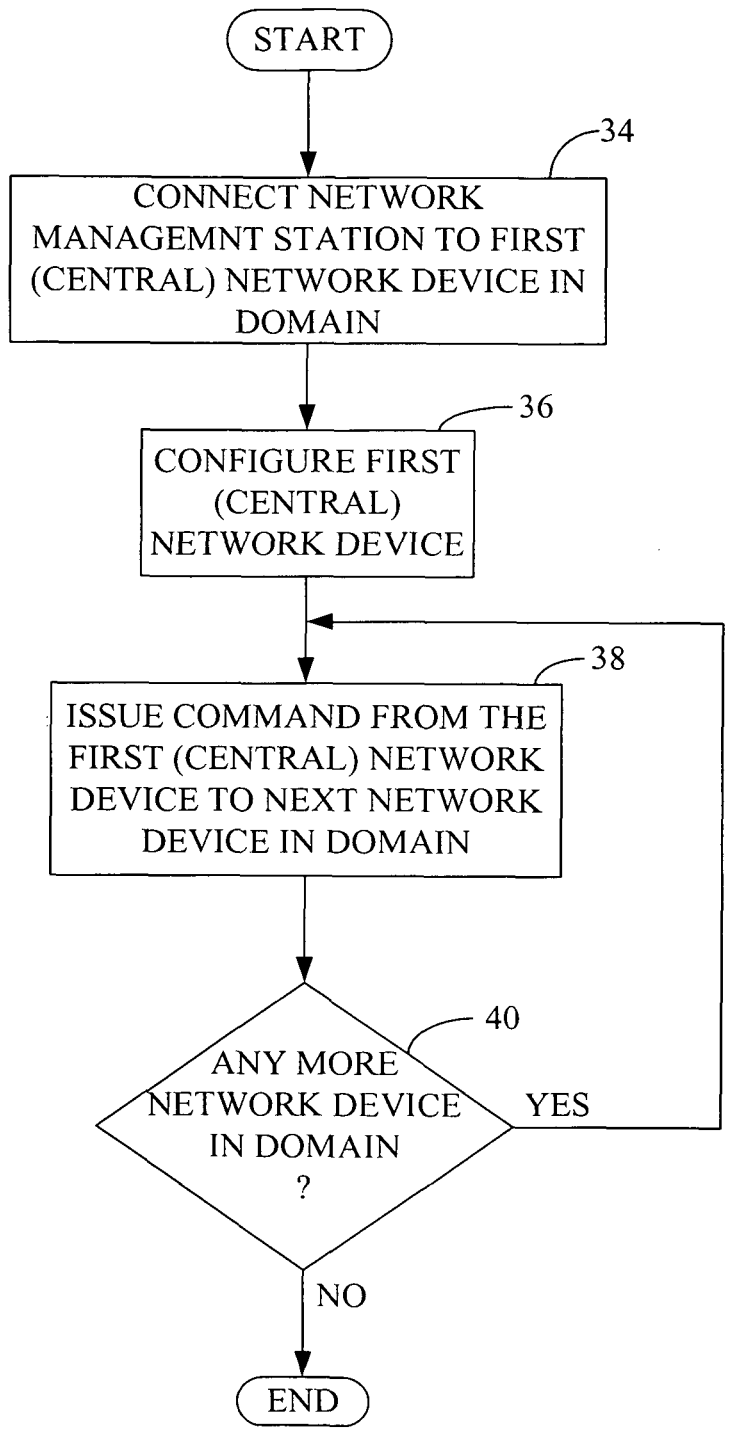
FIG. 5 is a flowchart for describing the manner in which network devices in a domain are configured; and, FIG. 6 is a conventional process for configuring network devices.
Figure 6:
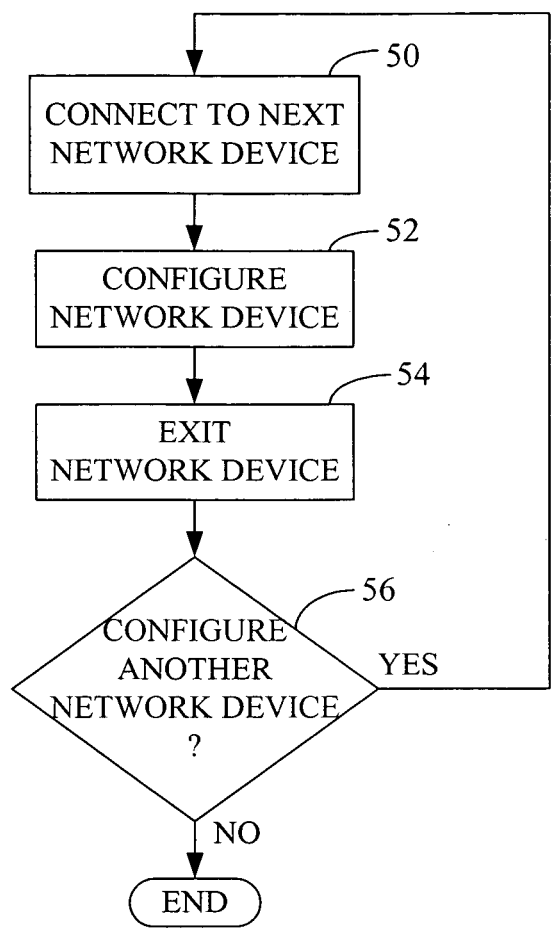

Once the domain(s) 30 has been established, the network management station 14, as the administrator, may access and configure any of the network devices 12 in the domain. As a way of example, and referring to FIG. 5, the manner in which the network management station 14 creates a virtual local area network (VLAN), for example, for the network devices 12 in the domain 30 is described. To access the network devices 12 in the domain, the network management station or administrator 14 first connects to any of the network devices 12 in the domain, which then becomes the central network device 32 (block 34). Once connected, the network management station 14 issues a command to the central network device 32 to create the VLAN (block 36). In response, the CPU 16 in the central network device 32 configures the central network device to be part of the VLAN.

The central network device 32 then accesses its memory 18 to determine what other network devices 12 are in the domain 30 and issues the same command received from the network management station 14 to the next network device in the domain to create the VLAN in the next device (block 38). The central network device 32 then determines whether there are anymore network devices 12 in the domain 30 (block 40) and issues the same command to create VLAN to each of the network devices in the domain until all the network devices in the domain have been configured in accordance with the command initially issued by the network management station 14.

Each of the network devices 12 in the domain 30 receives commands from the central network device 32 in the form of data packets through one of its network ports 20. The command then goes to the CPU 16, specifically the management agent 22, which determines that a VLAN is to be created and then configures itself to create that VLAN. Once the VLAN has been created, the network device 12 sends a data packet back to the central network device 32 confirming that VLAN has been created.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for configuring network devices in a network having a plurality of user computing devices, a plurality of network devices and a management device for managing the network devices, comprising:
   creating a domain including the plurality of network devices by connecting said management device to each of said network devices, and separately issuing a command from said management device to each of said network devices to add said each of said network devices to said domain, wherein said each of said network devices adds itself to said domain upon receiving said command from said management device;
   configuring one of the plurality of network devices as a central network device after said domain has been created;
   issuing a first configuration command from said management device to the central network device, wherein the first configuration command comprises a command to create a virtual local area network (VLAN) for the plurality of network devices in the created domain;
   configuring the central network device to create the VLAN according to the first configuration command;
   in response to receipt of the first configuration command by the central network device from the management device, issuing, by the central network device, a second configuration command from said central network device to at least another one of said plurality of network devices in said domain to configure said at least another one of said plurality of network devices; and
   configuring the at least another one of said plurality of network devices according to a command contained in the second configuration command.

2. The method as defined in claim 1, wherein each of said network devices maintains a record of the network devices that are in said domain.

3. The method as described in claim 1, wherein said network devices are in a trusted relationship with each other.

4. The method as defined in claim 1, wherein said first configuration command from said management device to said first network device is issued via the network using a network protocol.

5. The method as defined in claim 4, wherein said first configuration command is issued using one of SNMP, SSH, XML and Telnet (CLI) network protocols.

6. The method as defined in claim 1, wherein said second configuration command from said central network device is issued via the network using a network protocol.

7. The method as defined in claim 6, wherein said second configuration command is issued using one of SNMP, SSH, XML and Telnet (CLI) network protocols.

8. The method as defined in claim 1, wherein said first configuration command from said management device is received by a management agent in said central network device, and said second configuration command is issued by said management agent in said central network device to a management agent in said at least one of said network devices.

9. The method according to claim 1, wherein the second configuration command is equivalent to the first configuration command.

10. The method according to claim 1, further comprising:
   accessing, by the central network device, a memory to determine the plurality of network devices in the created domain; and
   wherein issuing the second configuration command further comprises issuing the command to create the VLAN to the plurality of network devices in the created domain.

11. The method according to claim 10, wherein configuring the at least another one of said plurality of network devices further comprises configuring the at least another one of said plurality of network devices itself to create the VLAN.

* * * * *